US007493305B2

(12) United States Patent
Thusoo et al.

(10) Patent No.: US 7,493,305 B2
(45) Date of Patent: Feb. 17, 2009

(54) EFFICIENT QUERIBILITY AND MANAGEABILITY OF AN XML INDEX WITH PATH SUBSETTING

(75) Inventors: Ashish Thusoo, Fremont, CA (US); Sivasankaran Chandrasekar, Palo Alto, CA (US); Ravi Murthy, Fremont, CA (US); Nipun Agarwal, Santa Clara, CA (US); Eric Sedlar, San Francisco, CA (US); Sreedhar Mukkamalla, San Francisco, CA (US); Reema Koo, Los Altos, CA (US)

(73) Assignee: Oracle International Corporation, Redwood Shores, CA (US)

( * ) Notice: Subject to any disclaimer, the term of this patent is extended or adjusted under 35 U.S.C. 154(b) by 708 days.

(21) Appl. No.: 11/059,665

(22) Filed: Feb. 15, 2005

(65) Prior Publication Data
US 2005/0228791 A1 Oct. 13, 2005

Related U.S. Application Data

(60) Provisional application No. 60/590,309, filed on Jul. 21, 2004, provisional application No. 60/580,445, filed on Jun. 16, 2004, provisional application No. 60/560,927, filed on Apr. 9, 2004.

(51) Int. Cl.
*G06F 17/30* (2006.01)
(52) U.S. Cl. .................... 707/2; 707/E17.041; 707/101
(58) Field of Classification Search ..................... 707/2, 707/3, 10, 101, 102, 104.1, E17.041, E17.042
See application file for complete search history.

(56) References Cited

U.S. PATENT DOCUMENTS

| 5,210,686 | A | 5/1993 | Jernigan |
| 5,369,763 | A | 11/1994 | Biles |
| 5,404,513 | A | 4/1995 | Powers et al. |
| 5,410,691 | A | 4/1995 | Taylor |
| 5,454,101 | A | 9/1995 | Mackay et al. |
| 5,467,471 | A | 11/1995 | Bader |

(Continued)

FOREIGN PATENT DOCUMENTS

WO        WO 01/42881 A2     6/2001

(Continued)

OTHER PUBLICATIONS

International Searching Authority, "Notification of Transmittal of the International Search Report and the Written Opinion of the International Searching Authority, or the Declaration," PCT/US2005/011763, dated Aug. 6, 2005, 12 pages.

(Continued)

*Primary Examiner*—Leslie Wong
(74) *Attorney, Agent, or Firm*—Hichman Palermo Truong & Becker LLP

(57) ABSTRACT

A method and system are provided for determining whether a given path is an indexed path of XML documents stored in a database management system. A finite state machine is built using the path subsetting rules specified by a user. The finite state machine is traversed using the given path. If any accepting states are reached during the traversal of the finite state machine, the given path is determined to matching the path subsetting rules.

38 Claims, 7 Drawing Sheets

U.S. PATENT DOCUMENTS

| | | | |
|---|---|---|---|
| 5,524,240 | A | 6/1996 | Barbara et al. |
| 5,530,849 | A | 6/1996 | Hanushevsky et al. |
| 5,544,360 | A | 8/1996 | Lewak et al. |
| 5,546,571 | A | 8/1996 | Shan et al. |
| 5,568,640 | A | 10/1996 | Nishiyama et al. |
| 5,643,633 | A | 7/1997 | Telford et al. |
| 5,680,614 | A | 10/1997 | Bakuya et al. |
| 5,701,467 | A | 12/1997 | Freeston |
| 5,838,965 | A | 11/1998 | Kavanagh et al. |
| 5,842,212 | A | 11/1998 | Balluvio et al. |
| 5,870,590 | A * | 2/1999 | Kita et al. ................ 716/4 |
| 5,917,492 | A | 6/1999 | Bereiter et al. |
| 5,921,582 | A | 7/1999 | Gusack |
| 5,974,407 | A | 10/1999 | Sacks |
| 6,055,544 | A | 4/2000 | DeRose et al. |
| 6,101,500 | A | 8/2000 | Lau |
| 6,111,578 | A | 8/2000 | Tesler |
| 6,112,209 | A | 8/2000 | Gusack |
| 6,128,610 | A | 10/2000 | Srinivasan et al. |
| 6,141,655 | A | 10/2000 | Johnson et al. |
| 6,182,121 | B1 | 1/2001 | Wlaschin |
| 6,192,273 | B1 | 2/2001 | Igel et al. |
| 6,192,373 | B1 | 2/2001 | Haegele |
| 6,208,993 | B1 | 3/2001 | Shadmon |
| 6,236,988 | B1 | 5/2001 | Aldred |
| 6,279,007 | B1 | 8/2001 | Uppala |
| 6,330,573 | B1 | 12/2001 | Salisbury et al. |
| 6,366,934 | B1 | 4/2002 | Cheng et al. |
| 6,370,537 | B1 | 4/2002 | Gilbert et al. |
| 6,427,123 | B1 | 7/2002 | Sedlar |
| 6,470,344 | B1 | 10/2002 | Kothuri et al. |
| 6,487,546 | B1 | 11/2002 | Witkowski |
| 6,496,842 | B1 | 12/2002 | Lyness |
| 6,519,597 | B1 | 2/2003 | Cheng et al. |
| 6,584,459 | B1 | 6/2003 | Chang et al. |
| 6,604,100 | B1 | 8/2003 | Fernandez et al. |
| 6,636,845 | B2 | 10/2003 | Chau et al. |
| 6,643,633 | B2 | 11/2003 | Chau et al. |
| 6,697,805 | B1 | 2/2004 | Choquier et al. |
| 6,708,186 | B1 | 3/2004 | Claborn et al. |
| 6,725,212 | B2 | 4/2004 | Couch et al. |
| 6,826,727 | B1 | 11/2004 | Mohr et al. |
| 6,836,857 | B2 | 12/2004 | Ten-Hove et al. |
| 7,031,956 | B1 | 4/2006 | Lee et al. |
| 7,096,224 | B2 | 8/2006 | Murthy et al. |
| 7,139,746 | B2 | 11/2006 | Shin et al. |
| 7,162,485 | B2 | 1/2007 | Gottlob et al. |
| 7,171,404 | B2 | 1/2007 | Lindblad et al. |
| 7,171,407 | B2 * | 1/2007 | Barton et al. ................ 707/4 |
| 7,216,127 | B2 | 5/2007 | Auerbach |
| 7,366,735 | B2 | 4/2008 | Chandrasekar et al. |
| 2001/0049675 | A1 | 12/2001 | Mandler et al. |
| 2002/0073019 | A1 | 6/2002 | Deaton |
| 2002/0078068 | A1 | 6/2002 | Krishnaprasad et al. |
| 2002/0116457 | A1 | 8/2002 | Eshleman et al. |
| 2002/0143512 | A1 | 10/2002 | Shamoto et al. |
| 2002/0152267 | A1 | 10/2002 | Lennon |
| 2002/0156811 | A1 | 10/2002 | Krupa |
| 2002/0184188 | A1 | 12/2002 | Mandyam et al. |
| 2002/0184401 | A1 | 12/2002 | Kadel Jr. et al. |
| 2002/0188613 | A1 | 12/2002 | Chakraborty et al. |
| 2003/0009361 | A1 | 1/2003 | Hancock et al. |
| 2003/0065659 | A1 | 4/2003 | Agarwal et al. |
| 2003/0078906 | A1 | 4/2003 | Ten-Hove et al. |
| 2003/0101194 | A1 | 5/2003 | Rys et al. |
| 2003/0131051 | A1 | 7/2003 | Lection et al. |
| 2003/0177341 | A1 | 9/2003 | Devillers |
| 2003/0212662 | A1 | 11/2003 | Shin et al. |
| 2003/0212664 | A1 | 11/2003 | Breining et al. |
| 2004/0010752 | A1 | 1/2004 | Chan et al. |
| 2004/0044659 | A1 | 3/2004 | Judd et al. |
| 2004/0064466 | A1 | 4/2004 | Manikutty et al. |
| 2004/0068494 | A1 | 4/2004 | Tozawa et al. |
| 2004/0088320 | A1 | 5/2004 | Perry |
| 2004/0103105 | A1 | 5/2004 | Lindblad et al. |
| 2004/0148278 | A1 | 7/2004 | Milo et al. |
| 2004/0167864 | A1 * | 8/2004 | Wang et al. ................ 707/1 |
| 2004/0205551 | A1 | 10/2004 | Santos |
| 2004/0267760 | A1 | 12/2004 | Brundage et al. |
| 2005/0038688 | A1 * | 2/2005 | Collins et al. ................ 705/9 |
| 2005/0050016 | A1 * | 3/2005 | Stanoi et al. ................ 707/3 |
| 2005/0091188 | A1 | 4/2005 | Pal et al. |
| 2005/0097084 | A1 | 5/2005 | Balmin et al. |
| 2005/0108630 | A1 | 5/2005 | Wasson et al. |
| 2005/0120031 | A1 | 6/2005 | Ishii |
| 2005/0228792 | A1 | 10/2005 | Chandrasekaran et al. |
| 2005/0228818 | A1 | 10/2005 | Murthy et al. |
| 2005/0229158 | A1 | 10/2005 | Thusoo et al. |
| 2005/0257201 | A1 | 11/2005 | Rose et al. |
| 2005/0289125 | A1 | 12/2005 | Liu et al. |
| 2007/0250527 | A1 | 10/2007 | Murthy et al. |

FOREIGN PATENT DOCUMENTS

| | | |
|---|---|---|
| WO | WO 01/59602 A1 | 8/2001 |
| WO | WO 01/61566 A1 | 8/2001 |
| WO | WO 03/027908 A2 | 4/2003 |

OTHER PUBLICATIONS

Current Claims, PCT/US2005/011763, 4 pages.

Cooper, Brian F. et al., "A Fast Index for Semistructured Data ," Proceeding of the International Conference on Very Large Databases, 2001, XP-002303292, pp. 341-350.

McHugh, Jason, et al. "Indexing Semistructured Data," Stanford Science Department, 1998, XP-002248313, pp. 1-21.

McHugh, Jason, et al., "Query Optimization for XML," Proceeding of the 25$^{th}$ VLDB Conference, Edinburgh, Scotland, 1999, XP-002333353, pp. 315-326.

Diao, Y. et al., "Path Sharing and Predicate Evaluation for High-Performance XML Filtering" XP-002344354 *ACM Transactions on Database Systems* (2003), pp. 467-516.

Diao, Y. et al., "YFilter: Efficient and Scalable Filtering of XML Documents" *IEEE* (2002) 2 pages.

Helmer, S. et al., "Optimized Translations of XPath into Algebraic Expressions Parameterized by Programs Containing Navigational Primitives" *IEEE* (2002) 10 pages.

Notification of Transmittal of the International Search Report and the Written Opinion of the International Searching Authority, or the Declaration for pending international application No. PCT/US2005/020802.

Pending claims for pending international application No. PCT/US2005/020802.

International Preliminary Examining Authority, "Notification of Transmittal of the International Preliminary Report of Patentability," PCT/US2005/020795, dated Aug. 7, 2006, 10 pages.

International Preliminary Examining Authority, "Written Opinion of the International Preliminary Examining Authority," PCT/US2005/020795, received May 31, 2006, 5 pages.

Claims, PCT/US2005/020795, 3 pages.

W3C, "XML Fragment Interchange," W3C Working Draft, Jun. 30, 1999, XP-002167090, 17 pages.

Kudrass, Thomas, "Management of XML Documents Without Schema in Relational Database Systems," Information and Software Technology, vol. 44, No. 4, Mar. 31, 2002, XP-004347776, pp. 269-275.

MacKenzie, David et al., "Finding Files", GNU Findutils Version 4.1.2, Nov. 1994, 38 pages.

U.S. Appl. No. 10/884,311, filed Jul. 2, 2004, Office Action Mailing Date Apr. 17, 2007.

U.S. Appl. No. 10/944,171, filed Sep. 16, 2004, Office Action Mailing Date Apr. 19, 2007.

U.S. Appl. No. 11/034,490, filed Jan. 12, 2005, Office Action Mailing Date Apr. 23, 2007.

Claims, Foreign Application No. 200580018627.9, 3 pages.

State Intellectual Property Office of P.R.C., "Notification of the First Office Action", Foreign Application No. 200580018627.9, mailed Oct. 12, 2007, 9 pages.

Mackenzie et al., "Finding Files" FindingUtils, Version 4.1.2, Source Code, GNU.org, Nov. 31, 1994, source files, code.c; 3 pages.

Cormen et al., "Introduction to Algorithms", MIT Press, 2nd Edition, 2001, 4 pages.

Shankar Pal et al., "Indexing XML Data Stored in a Relational Database", Proceedings of the 30th VLDB Conference, 2004, 12 pages.

Mackenzie et al., "Finding Files", FindUtils, Version 4.1.2, Source Code, GNU.org, Nov. 1997, source files, code. C, 22 pages.

Cormen et al., "Introduction to Algorithms", MIT Press, 2001, 2nd Edition, 4 pages.

European Patent Office, "Communication pursuant to Article 94 (3) EPC", European patent application 05732473.3-1225, dated Feb. 4, 2008, 7 pages.

State Intellectual Property Office of P.R.C., "Notification of the First Office Action", European patent application 2005800186273.9, dated Oct. 12, 2007, 9 pages.

Claims, European patent application 2005800186273.9, 3 pages.

Claims, European patent application 05732473.3-1225, 3 pages.

Vorthmann, S. et al. "Beyond Schemas, Schema Adjuncts and the Outside World," Markup Languages, Online!, vol. 2, No. 3, Jun. 2000, pp. 1-8.

W3C, XML Path Language (XPath) Version 1.0, W3C Recommendation Nov. 16, 1999 [online] Copyright 1999 [retrieved on Aug. 16, 2004]. Retrieved from the Internet: <http://www.w3.org/TR/xpath>.

Zisman et al., "Using XML to Build Consistency Rules for Distributed Specifications," Proceedings of the Tenth International Workshop on Software Specification and Design (IWSD'00), IEEE 2000, 8 pages.

Draper, Denise, Mapping Between XML and Relational Data [online], Feb. 6, 2004 [retrieved on Aug. 17, 2004]. Retrieved from the Internet: <http://www.awprofessional.com/articles/printerfriendly.asp?p=169590>.

Jonah, Kevin, Databases Tag Along with XML [online], Jul. 1, 2002, [retrieved on Aug. 17, 2004]. Retrieved from the Internet: <http://www.gcn.com/21_17/guide/19148-1.html.

Lehmann, Mike, From XML to Storage and Back [online], [retrieved on Aug. 17, 2004]. Retrieved from the Internet: <www.oracle.com/technology/oramag/oracle/03-mar/o23xml.html.

Lo et al., "XAS: A System for Accessing Componentized, Virtual XML Documents," IEEE, 2001, pp. 493-502.

Michell, Nancy, Data Shredding, Updating the Status Bar, and More [online], Feb. 2003, [retrieved on Aug. 17, 2004]. Retrieved from the Internet: <http://msdn.microsoft.com/msdnmag/issues/03/03/WebQA/>.

Myllymaki, Jussi, "Effective Wed data Extraction with Standard XML Technologies," WWW10, May 1-5, 2001, pp. 689-696.

Noser, Hansrudi et al., "Dynamic 3D Visualization of Database-Defined Tree Structures on the WWW by Using Rewriting Systems," 2000, IEEE, XP-002262516, pp. 247-254.

Schmidt et al., "Why and How to Benchmark XML Databases," SIGMOND Record, vol. 3, No. 3, Sep. 2001, pp. 27-32.

Bourret, R. et al., "A Generic Load/Extract Utility For Data Transfer Between XML Documents and Relational Databases," Proc. Second International Workshop on Advanced Issues of E-Commerce and Web-Based Information Systems, IEEE Computing Society, Jun. 8-9, 2000, pp. 134-143.

Braga, Daniele et al., "A Graphical Environment to Query XML Data with Query," Proceedings of the Fourth International Conference on Web Information Systems Engineering (WISE '03), 2003, IEEE, 10 pages.

ChaE, Mi-Ok et al., "Design and Implementation of an Object-Oriented Multimedia DBMS Tightly Coupled with Information Retrieval Functions," Proc. 17th IASTED International Conference on Applied Informatics, Feb. 15-18, 1999, abstract.

Cheng, Josephine et al., "IBM DB2 XML Extender," IEEE, ICDE '00 Conference, San Diego, Feb. 2000, 128 pages.

European Patent Office, "Communication Pursuant to Article 96(2) EPC," EP App. No. 02799692.5, dated Jan. 18, 2006, 5 pages.

Current Claims PCT/US02/31168, EP App. No. 02799692.5, 8 pages.

Myllymaki, Jussi, "Effective Wed data Extraction with Standard XML Technologies," WWW10, May 1-5, 2001, pp. 689-696.

* cited by examiner

EFFICIENT QUERIBILITY AND MANAGEABILITY OF AN XML INDEX WITH PATH SUBSETTING

PRIORITY CLAIM

This application claims priority to U.S. Provisional Patent Application Ser. No. 60/590,309, entitled EFFICIENT QUERIBILITY AND MANAGEABILITY OF AN XML INDEX WITH PATH SUBSETTING, filed on Jul. 21, 2004, the contents of which are herein incorporated by reference in their entirety for all purposes.

This application claims priority to U.S. Provisional Patent Application No. 60/560,927 entitled XML INDEX FOR XML DATA STORED IN VARIOUS STORAGE FORMATS, filed on Apr. 9, 2004, the contents of which are herein incorporated by reference in their entirety for all purposes.

This application claims priority to U.S. Provisional Patent Application No. 60/580,445 entitled XML INDEX FOR XML DATA STORED IN VARIOUS STORAGE FORMATS, filed on Jun. 16, 2004, the contents of which are herein incorporated by reference in their entirety for all purposes.

FIELD OF THE INVENTION

The present invention relates to managing information and, more specifically, efficiently managing and querying XML documents stored in a relational database management system.

BACKGROUND

In recent years, database systems that allow storage and querying of extensible Markup Language data ("XML data") have been developed. Though there are many evolving standards for querying XML, all of them include some variation of XPath. XPath is a language that describes a way to locate and process items in XML documents by using an addressing syntax based on a path through the document's logical structure or hierarchy. The portion of an XML document identified by an XPath "path expression" is the portion that resides, within the structure of the XML document, at the end of any path that matches the path expression.

A query that uses a path expression to identify one or more specific pieces of XML data is referred to herein as a path-based query. The process of determining which XML data corresponds to the path designated in a path-based query is referred to as "evaluating" the path expression.

Unfortunately, even database systems that have built-in support for storing XML data are usually not optimized for handle path-based queries, and the query performance of the databases systems leaves much to be desired. In specific cases where an XML schema definition may be available, the structure and data types used in XML instance documents may be used to optimize XPath queries. However, in cases where an XML schema definition is not available, and the documents to be searched do not conform to any schema, there are no efficient techniques for path-based querying.

Some database systems may use ad-hoc mechanisms to satisfy XPath queries that are run against documents where the schema of the documents is not known. For example, a database system may satisfy an XPath query by performing a full scan of all stored XML documents. While a full scan of all documents can be used to satisfy all XPath queries, the implementation would be very slow due to the lack of indexes.

Another way to satisfy XPath queries involves the use of text keywords. Specifically, many database systems support text indexes, and these could be used to satisfy certain XPaths. However, this technique can only satisfy a small subset of XPath queries, and in particular, cannot satisfy path-based querying.

None of these mechanisms fulfill the need for a quick and efficient process of evaluating path-based queries of XML documents. An XML index that can be used to quickly evaluate a path-based query is needed.

Database indexes enable data to be searched without a sequential scan of all of the data. Indexes are typically built using all available data in the database. However, XML documents that are being stored in a database may include several paths that will never be used in a path-based query. For example, document-oriented XML data may include formatting elements that will typically not be used in path-based queries. Therefore, any XML path-based index that indexes all paths in XML documents stored in a database will needlessly include data that will not be used. As more paths are indexed, and the index grows, execution of queries that use such an index are likely to become slower.

It would be beneficial to be able to selectively index only those paths that are more likely to be the subject of a path-based query when building a path-based XML index. In particular, there is a need to quickly and efficiently parse new documents that are being added to the database such that only paths that match a "path subsetting" rule are added to the index. In addition, there is a need to quickly and efficiently check to see if an incoming path-based query could be satisfied by an index before attempting to evaluate the path expression using the index.

Based on the foregoing, there is a clear need for a system and method for managing an XML index by specifying paths for inclusion in the index, as well as a system and method for determining whether a given path expression is a path that is indexed by the index.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The present invention is illustrated by way of example, and not by way of limitation, in the figures of the accompanying drawing, in which like reference numerals refer to similar elements and in which.

DETAILED DESCRIPTION

Figure 1:
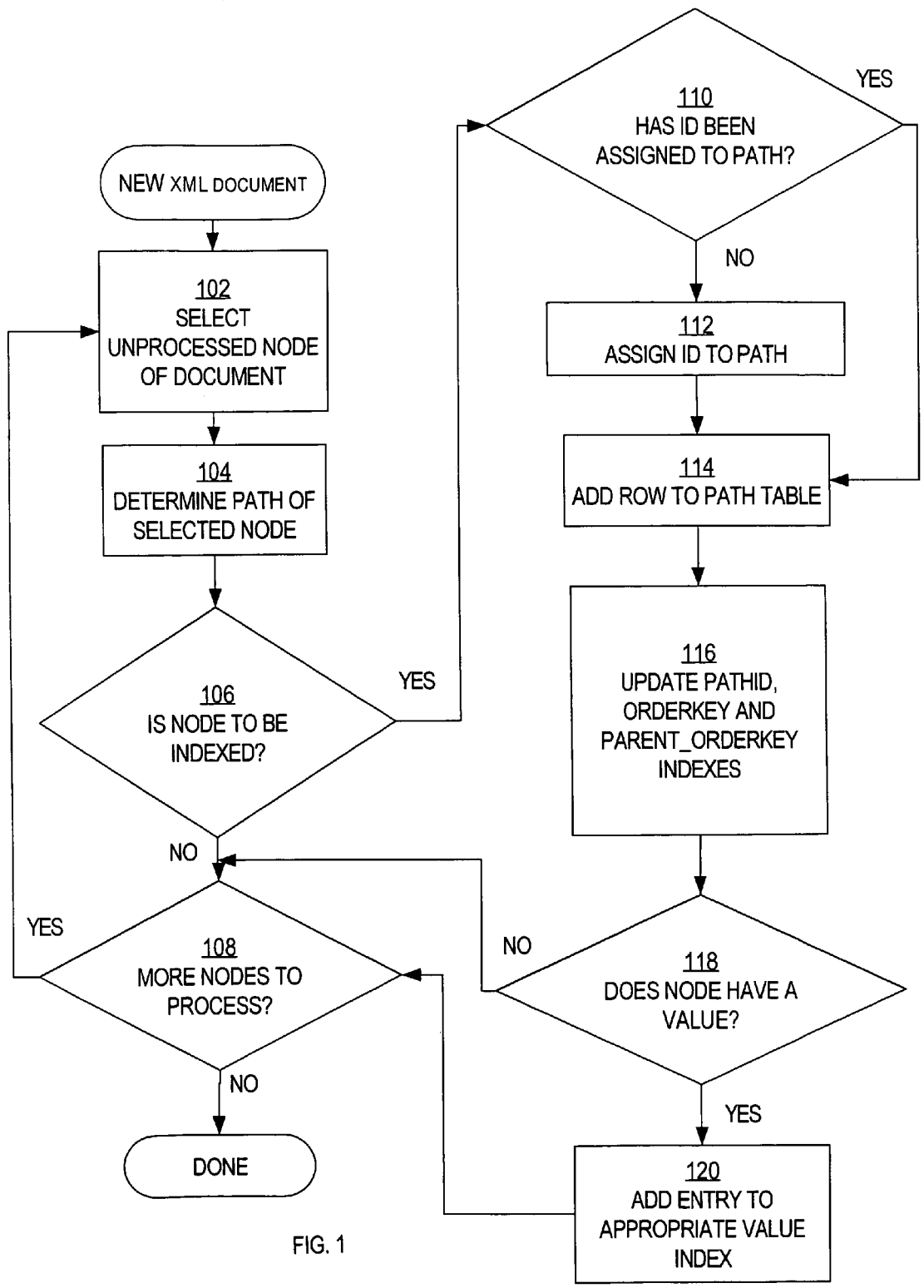
FIG. 1 is a flowchart illustrating steps for updating an XML index for a new XML document.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Example XML Documents

For the purpose of explanation, examples shall be given hereafter with reference to the following two XML documents:

```
po1.xml

<PurchaseOrder>
    <Reference>SBELL-2002100912333601PDT</Reference>
    <Actions>
        <Action>
            <User>SVOLLMAN</User>
        </Action>
    </Actions>
    ...
</PurchaseOrder>
po2.xml <PurchaseOrder>
    <Reference>ABEL-20021127121040897PST</Reference>
    <Actions>
        <Action>
            <User>ZLOTKEY</User>
        </Action>
        <Action>
            <User>KING</User>
        </Action>
    </Actions>
    ...
</PurchaseOrder>
```

As indicated above, po1.xml and po2.xml are merely two examples of XML documents. The techniques described herein are not limited to XML documents having any particular types, structure or content. Examples shall be given hereafter of how such documents could be indexed and accessed according to various embodiments of the invention.

The XML Index

U.S. patent application Ser. No. 10/884,311, entitled INDEX FOR ACCESSING XML DATA, filed on Jul. 2, 2004, (hereinafter the "XML Index application"), describes various embodiments of an index that may be used to efficiently access XML documents managed by a relational database server, based on XPath queries. Such an index shall be referred to herein as an XML index.

An XML index as described in the XML Index application may be used to process XPath queries regardless of the format and data structures used to store the actual XML data (the "base structures"). For example, the actual XML data can reside in structures within or outside of a database, in any form, such as CLOB (character LOB storing the actual XML text), O-R (object relational structured form in the presence of an XML schema), or BLOB (binary LOB storing some binary form of the XML data).

In one embodiment, an XML index is a logical index that results from the cooperative use of a path index, a value index, and an order index. The path index provides the mechanism to lookup nodes based on simple (navigational) path expressions. The value index provides the lookup based on value equality or range. The order index associates hierarchical ordering information with indexed nodes. The order index is used to determine parent-child, ancestor-descendant and sibling relationships between XML nodes.

When the user submits a query involving XPaths (as predicate or fragment identifier), the XPath statement is decomposed into a SQL query that accesses the XML index table(s). The generated query typically performs a set of path, value and order-constrained lookups and merges their results appropriately.

The PATH Table

According to one embodiment, a logical XML index includes a PATH table, and a set of secondary indexes. Each indexed XML document may include many indexed nodes. The PATH table contains one row per indexed node. For each indexed node, the row in the PATH table for the node contains various pieces of information associated with the node.

According to one embodiment, the information contained in the PATH table includes (1) a PATHID that indicates the path to the node, (2) "location data" for locating the fragment data for the node within the base structures, and (3) "hierarchy data" that indicates the position of the node within the structural hierarchy of the XML document that contains the node. Optionally, the PATH table may also contain value information for those nodes that are associated With values. Each of these types of information shall be described in greater detail below.

PATHs

The structure of an XML document establishes parent-child relationships between the nodes within the XML document. The "path" for a node in an XML document reflects the series of parent-child links, starting from a "root" node, to arrive at the particular node. For example, the path to the "User" node in po2.xml is /PurchaseOrder/Actions/Action/User, since the "User" node is a child of the "Action" node, the "Action" node is a child of the "Actions" node, and the "Actions" node is a child of the "PurchaseOrder" node.

The set of XML documents that an XML index indexes is referred to herein as the "indexed XML documents". According to one embodiment, an XML index may be built on all of the paths within all of the indexed XML documents. Alternatively, an XML index may be built on a specified subset of the paths within the indexed XML documents. The concept of indexing a particular subset of paths in the XML documents is known as "path subsetting." Path subsetting can be used to reduce the size of an XML index and thereby provide faster query execution because of the smaller amount of data that is included in the XML index.

Techniques for implementing path subsetting are described hereafter. The set of paths that are indexed by a particular XML index are referred to herein as the "indexed XML paths".

PATHIDs

According to one embodiment, each of the indexed XML paths is assigned a unique path identifier ("PATHID"). For example, the paths that exist in po1.xml and po2.xml may be assigned PATHIDs as illustrated in the following table:

| PATHID | PATH |
|--------|------|
| 1 | /PurchaseOrder |
| 2 | /PurchaseOrder/Reference |
| 3 | /PurchaseOrder/Actions |
| 4 | /PurchaseOrder/Actions/Action |
| 5 | /PurchaseOrder/Actions/Action/User |

Various techniques may be used to identify paths and assign PATHIDs to paths. For example, a user may explicitly enumerate paths, and specify corresponding PATHIDs for the paths thus identified. Alternatively, the database server may parse each XML document as the document is added to the set of indexed XML documents. During the parsing operation, the database server identifies any paths that have not already been assigned a PATHID, and automatically assigns new PATHIDs to those paths. The PATHID-to-path mapping may be stored within the database in a variety of ways. According to one embodiment, the PATHID-to-path mapping is stored as metadata separate from the XML indexes themselves.

According to one embodiment, the same access structures can be used for XML documents that conform to different schemas. Because the indexed XML documents may conform to different schemas, each XML document will typically only contain a subset of the paths to which PATHIDs have been assigned.

Location Data

The location data associated with a node indicates (1) where the XML document that contains the node resides within the base structures, and (2) where the XML fragment that corresponds to the node is located within the stored XML document. Thus, the nature of the location data will vary from implementation to implementation based on the nature of the base structures. Location information is typically added to the PATH table as XML documents are parsed.

For the purpose of explanation, it shall be assumed that (1) the base structures are tables within a relational database, and (2) each indexed XML document is stored in a corresponding row of a base table. In such a context, the location data for a node may include, for example, (1) the identifier of the row ("RID") in the base table in which the XML document containing the node is stored, and (2) a locator that provides fast access within the stored XML document, to the fragment data that corresponds to the indexed node.

Hierarchy Data

The PATH table row for a node also includes information that indicates where the node resides within the hierarchical structure of the XML document containing the node. Such hierarchical information is referred to herein as the "OrderKey" of the node.

According to one embodiment, the hierarchical order information is represented using a Dewey-type value. Specifically, in one embodiment, the OrderKey of a node is created by appending a value to the OrderKey of the node's immediate parent, where the appended value indicates the position, among the children of the parent node, of that particular child node.

For example, assume that a particular node D is the child of a node C, which itself is a child of a node B that is a child of a node A. Assume further that node D has the OrderKey 1.2.4.3. The final "3" in the OrderKey indicates that the node D is the third child of its parent node C. Similarly, the 4 indicates that node C is the fourth child of node B. The 2 indicates that Node B is the second child of node A. The leading 1 indicates that node A is the root node (i.e. has no parent).

As mentioned above, the OrderKey of a child may be easily created by appending to the OrderKey of the parent a value that corresponds to the number of the child. Similarly, the OrderKey of the parent is easily derived from the OrderKey of the child by removing the last number in the OrderKey of the child.

According to one embodiment, the composite numbers represented by each OrderKey are converted into byte-comparable values, so that a mathematical comparison between two OrderKeys indicates the relative position, within the structural hierarchy of an XML document, of the nodes to which the OrderKeys correspond.

For example, the node associated with the OrderKey 1.2.7.7 precedes the node associated with the OrderKey 1.3.1 in the hierarchical structure of an XML document. Thus, the database server uses a conversion mechanism that converts OrderKey 1.2.7.7 to a first value, and to convert OrderKey 1.3.1 to a second value, where the first value is less than the second value. By comparing the second value to the first value, the database server can easily determine that the node associated with the first value precedes the node associated with the second value. Various conversion techniques may be used to achieve this result, and the invention is not limited to any particular conversion technique.

Value Information

Some nodes within an indexed document may be attribute nodes or nodes that correspond to simple elements. According to one embodiment, for attribute nodes and simple elements that are indexed XML paths, the PATH table row also stores the actual value of the attributes and simple elements. Such values may be stored, for example, in a "value column" of the PATH table. The secondary "value indexes", which shall be described in greater detail hereafter, are built on the value column.

PATH Table Example

According to one embodiment, the PATH table includes columns defined as specified in the following table:

| Column Name | Datatype | Description |
|-------------|----------|-------------|
| PATHID | RAW(8) | ID for the path token. Each distinct path e.g. /a/b/c is assigned a unique id by the system. |
| RID | UROWID / ROWID | Identifier of the row in base table that stores the XML document containing the node. |
| ORDER_KEY | RAW(100) | Dewey OrderKey for the node e.g. 3.21.5 to indicate $5^{th}$ child of $21^{st}$ child of $3^{rd}$ child of root. |
| LOCATOR | RAW(100) | Information corresponding to the starting position for the fragment. This is used during fragment extraction. |
| VALUE | RAW(2000) / BLOB | Value of the node in case of attributes and simple elements. The type can be specified by the user (as well as the size of the RAW column) |

As explained above, the PATHID is an identifier assigned to the node, and uniquely represents a fully expanded path to the node. The ORDER_KEY is a system representation of the Dewey ordering number associated with the node. According to one embodiment, the internal representation of the Order-Key also preserves document ordering.

The VALUE column stores the effective text value for simple element (i.e. no element children) nodes and attribute nodes. According to one embodiment, adjacent text nodes are coalesced by concatenation. As described in the XML Index application, a mechanism is provided to allow a user to customize the effective text value that gets stored in VALUE column by specifying options during index creation e.g. behavior of mixed text, whitespace, case-sensitive, etc can be customized. The user can store the VALUE column in any number of formats, including a bounded RAW column or a BLOB. If the user chooses bounded storage, then any overflow during index creation is flagged as an error.

The following table is an example of a PATH table that (1) has the columns described above, and (2) is populated with entries for po1.xml and po2.xml. Specifically, each row of the PATH table corresponds to an indexed node of either po1.xml or po2.xml. this example, it is assumed that po1.xml and po2.xml are respectively stored at rows R1 and R2 of a base table, and that all nodes of po1.xml and po2.xml are indexed XML paths.

created by the database server to accelerate the queries that (1) perform path lookups and/or (2) identify order-based relationships. According to one embodiment, the following secondary indexes are created on the PATH table.

PATHID_INDEX on (PATHID, RID)
ORDERKEY_INDEX on (RID, ORDER_KEY)
VALUE INDEXES
PARENT_ORDERKEY_INDEX on (RID, SYS_ DEWEY_PARENT(ORDER_KEY))

PATHID_INDEX

The PATHID_INDEX is built on the PATHID, RID columns of the PATH table. Thus, entries in the PATHID_INDEX are in the form (keyvalue, rowid), where keyvalue is a composite value representing a particular PATHID/RID combination, and rowid identifies a particular row of the PATH table.

When (1) the base table row and (2) the PATHID of a node are known, the PATHID_INDEX may be used to quickly locate the row, within the PATH table, for the node. For example, based on the key value "3.R1", the PATHID_INDEX may be traversed to find the entry that is associated with the key value "3.R1". Assuming that the PATH table is popu-

POPULATED PATH TABLE

| rowid | PATHID | RID | ORDER_KEY | LOCATOR | VALUE |
|---|---|---|---|---|---|
| 1 | 1 | R1 | 1 | 1, 350 | |
| 2 | 2 | R1 | 1.1 | | SBELL-2002100912333601PDT |
| 3 | 3 | R1 | 1.2 | 64, 56 | |
| 4 | 4 | R1 | 1.2.1 | 73, 37 | |
| 5 | 5 | R1 | 1.2.1.1 | | SVOLLMAN |
| 6 | 1 | R2 | 1 | 1, 400 | |
| 7 | 2 | R2 | 1.1 | | ABEL-20021127121040897PST |
| 8 | 3 | R2 | 1.2 | 63, 89 | |
| 9 | 4 | R2 | 1.2.1 | 72, 36 | |
| 10 | 5 | R2 | 1.2.1.1 | | ZLOTKEY |
| 11 | 4 | R2 | 1.2.2 | 109, 33 | |
| 12 | 5 | R2 | 1.2.2.1 | | KING |

In this example, the rowid column stores a unique identifier for each row of the PATH table. Depending on the database system in which the PATH table is created, the rowid column may be an implicit column. For example, the disk location of a row may be used as the unique identifier for the row. As shall be described in greater detail hereafter, the secondary Order and Value indexes use the rowid values of the PATH table to locate rows within the PATH table.

In the embodiment illustrated above, the PATHID, ORDER_KEY and VALUE of a node are all contained in a single table. In alternative embodiment, separate tables may be used to map the PATHID, ORDER_KEY and VALUE information to corresponding location data (e.g. the base table RID and LOCATOR).

Secondary Indexes

The PATH table includes the information required to locate the XML documents, and/or XML fragments, that satisfy a wide range of queries. However, without secondary access structures, using the PATH table to satisfy such queries will often require full scans of the PATH table. Therefore, according to one embodiment, a variety of secondary indexes are lated as illustrated above, the index entry would have a rowid value of 3. The rowid value of 3 points to the third row of the PATH table, which is the row for the node associated with the PATHID 3 and the RID R1.

The ORDERKEY_INDEX

The ORDERKEY_INDEX is built on the RID and ORDER_KEY columns of the PATH table. Thus, entries in the ORDERKEY_INDEX are in the form (keyvalue, rowid), where keyvalue is a composite value representing a particular RID/ORDER_KEY combination, and rowid identifies a particular row of the PATH table.

When (1) the base table row and (2) the ORDERKEY of a node are known, the ORDERKEY_INDEX may be used to quickly locate the row, within the PATH table, for the node. For example, based on the key value "R1.'1.2'", the ORDERKEY_INDEX may be traversed to find the entry that is associated with the key value "R1.'1.2'". Assuming that the PATH table is populated as illustrated above, the index entry would have a rowid value of 3. The rowid value of 3 points to the third row of the PATH table, which is the row for the node associated with the ORDERKEY 1.2 and the RID R1.

The Value Indexes

Just as queries based on path lookups can be accelerated using the PATHID_INDEX, queries based on value lookups can be accelerated by indexes built on the VALUE column of the PATH table. However, the VALUE column of the PATH table can hold values for a variety of data types. Therefore, according to one embodiment, a separate value index is built for each data type stored in the VALUE column. Thus, in an implementation in which the VALUE column holds strings, numbers and timestamps, the following value (secondary) indexes are also created:

STRING_INDEX on SYS_XMLVALUE_TO_STRING (value)
NUMBER_INDEX on SYS_XMLVALUE_TO_NUMBER(value)
TIMESTAMP_INDEX on SYS_XMLVALUE_TO_TIMESTAMP(value)

These value indexes are used to perform datatype based comparisons (equality and range). For example, the NUMBER value index is used to handle number-based comparisons within user XPaths. Entries in the NUMBER_INDEX may, for example, be in the form (number, rowid), where the rowid points to a row, within the PATH table, for a node associated with the value of "number". Similarly, entries within the STRING_INDEX may have the form (string, rowid), and entries within the TIMESTAMP_INDEX may have the form (timestamp, rowid).

The format of the values in the PATH table may not correspond to the native format of the data type. Therefore, when using the value indexes, the database server may call conversion functions to convert the value bytes from stored format to the specified datatype. In addition, the database server applies any necessary transformations, as shall be described hereafter. According to one embodiment, the conversion functions operate on both RAW and BLOB values and return NULL if the conversion is not possible.

By default, the value indexes are created when the XML index is created. However, users can, suppress the creation of one or more of value indexes based on the knowledge of query workload. For example, if all XPath predicates involve string comparisons only, the NUMBER and TIMESTAMP value indexes can be avoided.

PARENT_ORDERKEY_INDEX

According to one embodiment, the set of secondary indexes built on the PATH table include a PARENT_ORDERKEY_INDEX. Similar to the ORDER_KEY index, the PARENT_ORDERKEY_INDEX is built on the RID and ORDER_KEY columns of the PATH table. Consequently, the index entries of the PARENT_ORDERKEY_INDEX have the form (keyvalue, rowid), where keyvalue is a composite value that corresponds to a particular RID/ORDER KEY combination. However, unlike the ORDER_KEY index, the rowid in a PARENT_ORDERKEY_INDEX entry does not point to the PATH table row that has the particular RID/ORDER_KEY combination. Rather, the rowid of each PARENT_ORDERKEY_INDEX entry points to the PATH table row of the node that is the immediate parent of the node associated with the RID/ORDER_KEY combination.

For example, in the populated PATH table illustrated above, the RID/ORDER_KEY combination "R1.'1.2'" corresponds to the node in row 3 of the PATH table. The immediate parent of the node in row 3 of the PATH table is the node represented by row 1 of the PATH table. Consequently, the PARENT_ORDERKEY_INDEX entry associated with the "R1.'1.2'" key value would have a rowid that points to row 1 of the PATH table (i.e. rowid=1).

Creating an XML Index

According to one embodiment, an XML index is created within a database in response to an index creation command received by a database server. For the purpose of explanation, the creation of an XML index shall be described in a context in which the XML documents to be indexed will be stored in an XMLType column of a relational table.

An example of the syntax of an SQL command that can be used to create an XML index is:

CREATE INDEX <index_name> ON [<schema>.]<table_name> (<column_name>) INDEXTYPE IS XMLINDEX [PARAMETERS '<parameter_clause>'];

For example, assume that the base structure is a table stylesheet_tab that stores stylesheets as XMLType identified by an ID column. Such a table may be created, for example, using the command:

CREATE TABLE stylesheet_tab (id number, stylesheet XMLType);

An XML index may be created on the stylesheet column of table stylesheet_tab. According to one embodiment, XML index "ss_tab_xmli" may be created using the following command:

CREATE INDEX ss_tab_xmli ON stylesheet_tab (stylesheet) INDEXTYPE IS XML INDEX;

The following command is an example of how an XML index ("purchaseorder_xmli") may be created on schema-based XMLType:

CREATE TABLE purchaseorder OF XMLType
XMLSchema http://xmlns.oracle.com/xdb/documentation/purchaseOrder.xsd ELEMENT "PurchaseOrder";
CREATE INDEX purchaseorder_xmli ON purchaseorder (object_value) INDEXTYPE IS XML INDEX;

The foregoing commands are merely examples of commands that may be submitted to a database server to cause the database server to create an XML index. The techniques described herein are not limited to any form or syntax for specifying the creation of indexes.

The parameters clause of the CREATE INDEX command can contain zero, one or more various parameters. The parameters allow a user to specify various characteristics of an XML index, such as:

Which paths to include or exclude from the set of indexed paths (i.e. path subsetting rules)
The names of the PATH table and secondary indexes
Storage options for the PATH table and secondary indexes (e.g. whether the PATH table should be stored as a partitioned table, an Index Organized Table, etc.)
Rules for handling values
The column type of the Value column (e.g. RAW or BLOB)

By default, when the user creates an XML index, the underlying PATH table and secondary indexes are automatically created using names generated by the system based on the name of the XML index. However, the user can explicitly specify the names of these objects in the parameters clause. Likewise, by default, the storage options for the PATH table and secondary indexes are derived from the storage properties of the base table on which the XML index is created. However, the user can also explicitly specify the storage properties for these objects through the parameters clause.

Path subsetting rules (i.e. which paths to include or exclude from the index) can be also be defined in the parameters clause, as is described in more detail below.

PATH Subsetting

According to one embodiment, when a user creates an XML index, by default, all nodes in the base documents are indexed (i.e. each node in a document corresponds to a row in the PATH table). However, in one embodiment, a user can explicitly specify a set of nodes (subtrees) to be indexed—thereby omitting the remaining nodes from the PATH table. This "path subsetting" process is typically used to exclude fragments which are known to be useless from a query standpoint. By reducing the number of indexed nodes, the space usage and management efficiency of the XML index can be improved.

The ability to control the set of indexed paths by including or excluding a specified set of paths or namespaces is especially beneficial in the context of document-oriented XML data as tags relating to formatting, etc. can be omitted from the index.

According to one embodiment, a mechanism is provided by which a user may specify path subsetting rules that determine which XML paths are to be indexed by an XML index. In one specific embodiment, a user may specify rules that expressly include certain XML paths, or rules that expressly exclude certain XML paths.

For example, a user may specify a set of XPaths or path expressions to identify the nodes in a document that are to be indexed. While the document is being indexed, each node of the document is matched against the user specified path expressions. If the node does not match any of the user specified path expressions, and no descendants of the node can match a path expression, then the subtree (XML fragment) rooted at the node is omitted from the index. If the node matches any of the user specified paths, then the fragment rooted at the node is added to the index. In addition, all ancestors (element nodes to the root) are also added to the index. Any namespace attributes within the ancestor element nodes are also added to the index.

According to one embodiment, an initial specification of path subsetting rules may occur at the time the XML index is created. In one embodiment, path subsetting rules are specified by a user through one or more parameters in the CREATE INDEX command used to create an XML index. In one embodiment, paths that are to be included in the XML index are specified in a 'PATHS' parameter. In this case, only nodes matching the specified paths are included in the XML index. Alternatively, paths that are not to be included in the index may be specified in a 'PATHS EXCLUDE' parameter. In this case, all paths that are not specified by the 'PATHS EXCLUDE' parameter are included in the XML index. Preferably, these parameters are mutually exclusive, and a CREATE INDEX command cannot include both.

For example, assume that the documents that are to be indexed are stored in a purchaseOrder table. If the user wants to index all the Lineitem elements and their children, and the purchase order reference number and requestor, then the following Create Index command can be issued:

CREATE INDEX POIndex1 ON purchaseOrder
INDEXTYPE IS XMLINDEX
PARAMETERS 'PATHS (/PurchaseOrder/LineItems//*, /PurchaseOrder/Reference, /PurchaseOrder/Requestor) PATH TABLE POIndex_path_table'

In this example, the POIndex_path_table denotes the name of the table used by the domain index to store the index data.

In this example, the path subsetting rules expressed by the PATHS parameter explicitly include certain paths; all paths not expressly included by the rules will be excluded from the index.

The rule /PurchaseOrder/LineItems//* includes a wildcard symbol "*". Consequently, the rule expressly includes the path /PurchaseOrder/LineItems and the path to all nodes that descend from the path /PurchaseOrder/LineItems. This is merely one example of how wildcards may be used in the rules. According to one embodiment, the path selection rule mechanism supports wildcards in any number of contexts. For example, the rule /nodex/*/nodey/nodez selects all paths that (1) descend from /nodex/ and (2) terminate in /nodey/nodez, regardless of the path between nodex and nodey/nodez.

When a user specifies rules that expressly exclude paths, during indexing, if a node matches any of the specified paths, the fragment rooted at that node is omitted from the index. Using the purchaseOrder table example above, all the paths of the documents except the Lineitem descriptions and the purchaseOrder actions will be included in the indexed XML paths when the following Create Index command is used to create the index POIndex_path_table2:

CREATE INDEX POIndex2 ON purchaseOrder
INDEXTYPE IS XML INDEX PARAMETERS 'PATHS EXCLUDE (/PurchaseOrder/LineItems/LineItems/Description, /PurchaseOrder/Actions) PATH TABLE POIndex_path_table2'

When an XML index is created that uses path subsetting, whether by a 'PATHS' parameter, a 'PATHS EXCLUDE' parameter, or any other method, the path subsetting rules specified by the user need to be saved for future reference. The path subsetting rules will be needed when a new XML document is added to the database so that only nodes of the new XML document that match the path subsetting rules are added to the XML index. Likewise, when a path-based query is submitted, there should be a method of quickly determining whether the path-based query can be satisfied with the XML index before attempting to use the XML index. If, the path in the query does not match the path subsetting rules, it will not be among the indexed XML paths. In addition, it would be beneficial to have the ability to change the path subsetting rules in order to alter the XML index. To do so requires that the current path subsetting rules be saved.

While it is possible to save the path subsetting rules in a text or XML document, for example, the techniques disclosed herein use a finite state machine to store path subsetting rules. The finite state machine can be used to quickly and efficiently determine whether any given path matches the path subsetting rules, and is therefore an indexed XML path.

The path subsetting finite state machine described herein is described in the context of an XML index created using the techniques described in the XML Index application. However, the techniques described herein can be used to efficiently manage any type of index used to process path-based queries. Use of an XML index as described in the XML Index application is not required to use the techniques disclosed herein.

Representing PATH Expressions with a Finite State Machine

A finite state machine is an "imaginary machine" or abstract computational model used by computer scientists to recognize and describe patterns. In automata theory, a symbol is a single thing, such as a letter. A word is a finite string formed by the concatenation of a number of symbols. An alphabet is a finite set of symbols, and a language is a set of words, formed by symbols in a given alphabet. One common application area for finite state machines is linguistics, as a finite state machine can be used to determine whether a string of letters or symbols belongs to a language or not. However, a finite state machine can be applied in many areas of science by defining appropriate alphabet, words and language.

In general, a finite state machine consists of a finite set of states, a start state, an input alphabet and a transition function that maps input symbols and current states to a next state. The machine is started in the start state and reads in a string of symbols from its alphabet as input. It uses the transition function to determine its next state using its current state, and the symbol just read or the empty string. If the final state that the machine is in after all the symbols of the input have been read is an accept state, then the input is accepted as a word in the language that this particular machine recognizes.

In a finite state machine that uses non-deterministic automata, more than one transition from a given state is possible for a given input, including a transition to itself. In a non-deterministic finite automaton (NFA) state machine, states may or may not have a transition for each symbol in the alphabet, or can even have multiple transitions for a symbol. An NFA "accepts" a word if there exists at least one path from the start state to an accepting state. In addition, the transition function can be extended so that instead of taking just one symbol of the alphabet, it receives a string of symbols, and returns the state in which the NFA will stay after processing the input.

Finite state machines are a natural and effective way to represent and process many XML path expressions, in particular path expressions composed of a sequence of location steps, where each location step consists of an axis and a node test. An axis specifies the hierarchical relationship between the nodes, such as parent-child ('/'), or descendent-or-self ('//'). A node test is typically a name test, which can be an element name or a wildcard operator '*'. Path expressions that are composed of a sequence of location steps can be transformed into regular expressions for which a NFA can accept, or not accept, the language described by the expression. That is, an NFA can represent a path expression. In such a path expression NFA, location steps are mapped to states, and a transition from an active state is initiated when an element is found in the input that matches the transition function.

Significantly, multiple path expressions that can be represented by individual NFAs can be combined into a single combined NFA that represents the set of path expressions. The use of a combined NFA allows a dramatic reduction in the total number of states needed to represent a set of path expressions as compared to using multiple individual NFAs to represent each path expression individually. In a combined NFA, the language accepted by the combined NFA is defined by all path expressions together.

Figure 4:
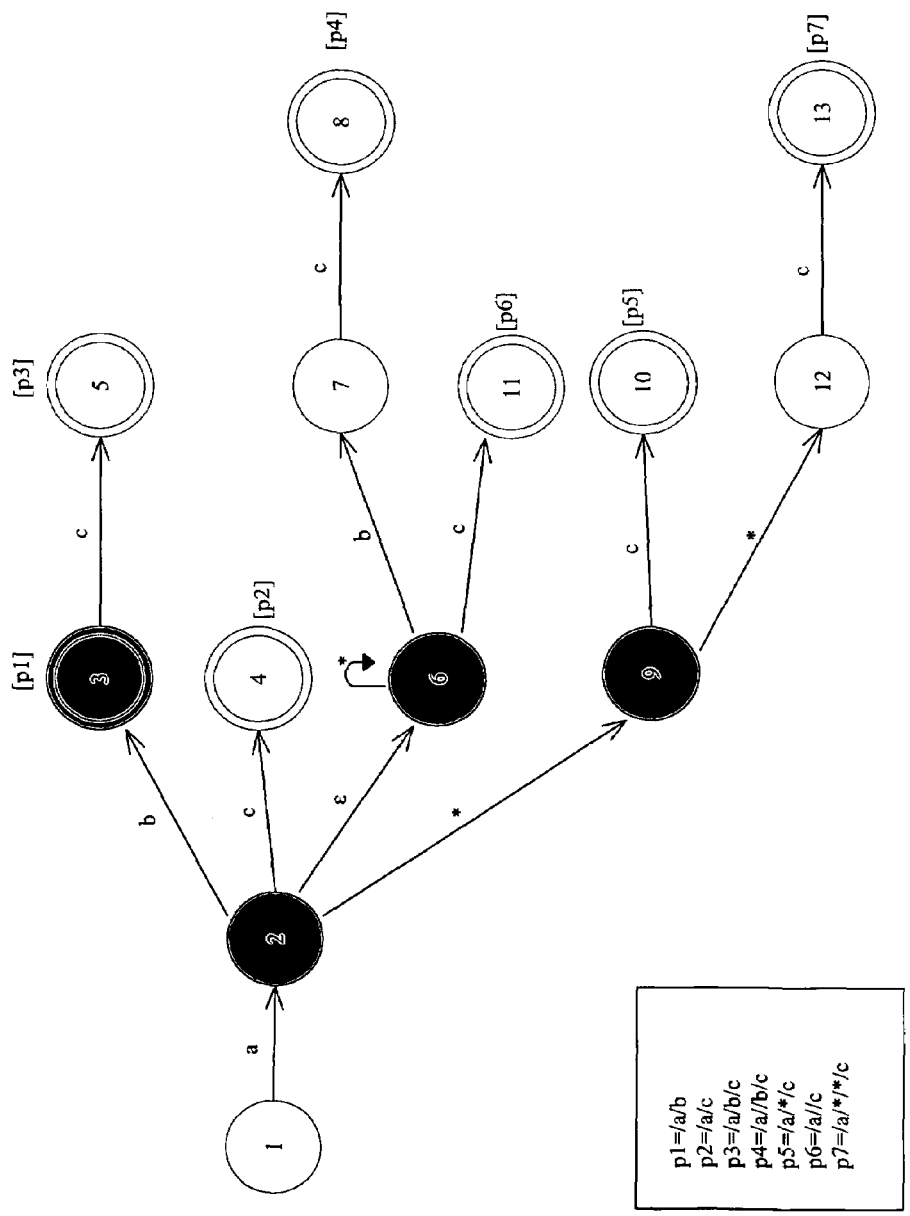
FIG. 4 is a directed graph illustrating a combined non-deterministic finite automaton (NFA) state machine for a set of path expressions.

A finite state machine can be conceptualized as a directed graph. In such a directed graph, a finite number of states are represented by circles, and transitions are represented by directed edges that show how the next symbol of input will cause the state to change. FIG. 4 is an example of a directed graph illustrating a combined NFA state machine that represents a set of seven path expressions (p1-p7 shown in FIG. 4). In the directed graph of FIG. 4, two concentric circles denote an accepting state, each marked with the ID of accepted path expression. The symbol on each directed edge represents an input that triggers the transition. The wildcard symbol '*' matches any element. An edge marked by $\epsilon$ represents an empty input transition. Shaded circles represent states shared by path expressions. As shown by the combined NFA of FIG. 4, the common prefixes of all the path expressions are shared. The NFA of FIG. 4 contains multiple accepting states, corresponding to the accepting states of the individual path expressions. While each path expression in the combined NFA has only a single accepting state, the single combined NFA represents multiple path expressions, and has multiple accepting states.

Creating a PATH Subsetting Finite State Machine

In the context of an XML index that uses path subsetting, the language recognized by a path subsetting finite state machine is the set of paths specified in the path subsetting rules. Although any type of finite state machine can be used to store the path subsetting rules, a state machine that uses a combined NFA is described herein.

In one embodiment, a combined NFA is created at the time of index creation. The NFA may be stored as "metadata" of the XML index. In another embodiment, the set of paths specified in the path subsetting rules are stored, for example as index metadata, and the NFA is constructed when the XML documents are added or queried.

When the CREATE INDEX command with a path subsetting rule (e.g. PATHS or EXLUDE PATHS parameter) is evaluated, a combined NFA is created for the set of paths specified in the path subsetting rule.

Figure 3:
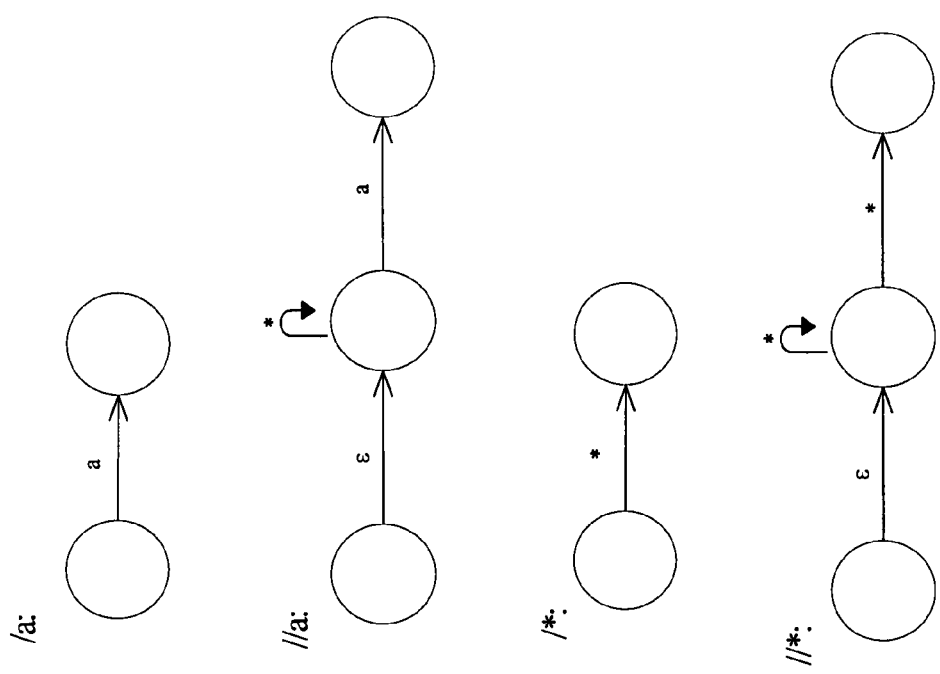
FIG. 3 illustrates directed graph templates for use in constructing a path subsetting finite state machine.

To construct an NFA for a path expression, templates may be defined for possible location steps, and then combined to form the path expression. The templates defined for four basic location steps are shown in FIG. 3. In FIG. 3, 'a' is an arbitrary symbol from the alphabet consisting of all elements, and '*' is a wildcard operator. As shown, $\epsilon$ transitions are taken when the parent state of such a transition is reached.

The individual templates of each location step in a path expression are chained one after the other to generate the NFA for that path. Path expression NFAs thus generated can be combined into a single NFA that represents a set of path expressions.

Consider a set of path expressions p1, p2 ... pn. Individual NFAs can-be constructed for each path expression, NFA1, NFA2, ... NFAn using the templates described above. The starting state for each of these NFAs is the same state (S). These NFAs can then be combined together to form a combined NFA that accepts all path expressions in the set (p1, p2 ... pn).

The combined NFA "NFA_final" that accepts all path expression p1, p2, ... pn can be incrementally constructed from NFA, NFA2, ... NFAn by using the following algorithm written in pseudo-code:

```
for (i=1; i<=n; i++)
        mergeNFAs(NFA_final, NFAi, i)
mergeNFAs(NFA_final, nfa, i)
{
   traverse NFA_final and nfa in lockstep;
   if accepting state of nfa is reached
      make the state in NFA_final accepting;
      add i to list of path expression IDs matched by the NFA_final state;
   else if transitions of NFA_final and nfa do not match
      add new branch to the NFA_final state;
      add NFA fragment starting from the mismatched transition
      of nfa to new branch;
      mark i as the path expression identified by the final state of nfa;
}
```

Figure 5B:
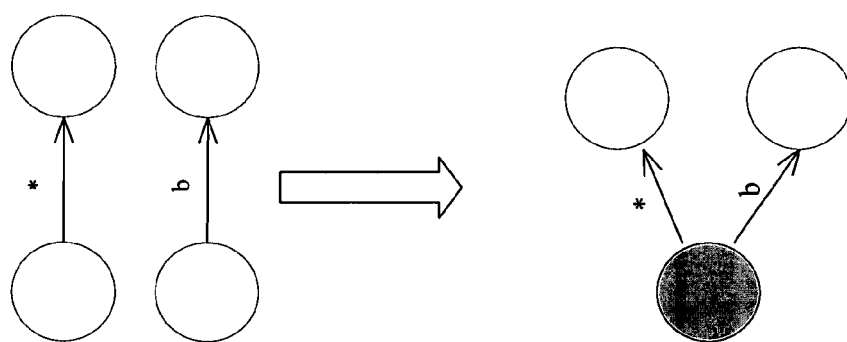
FIGS. 5A-5D are directed graphs illustrating examples of combining NFAs of individual path expressions into a single combined NFA.
Figure 5A:
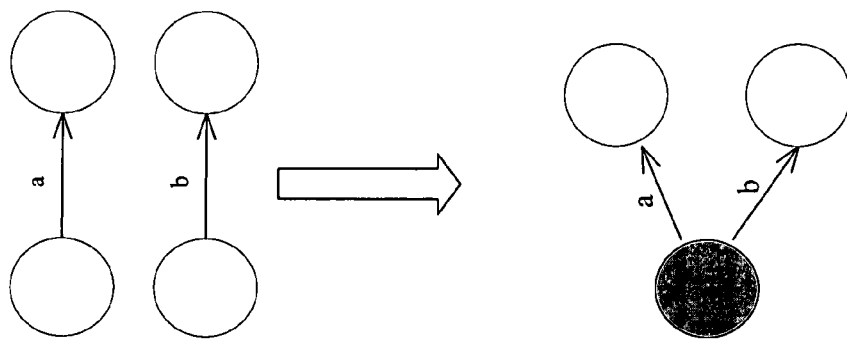
Figure 5D:
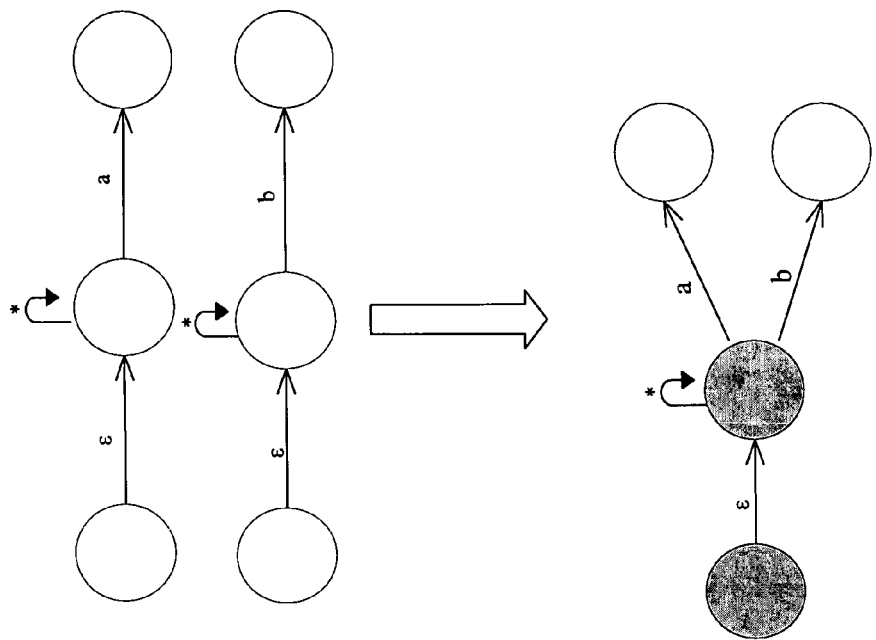
Figure 5C:
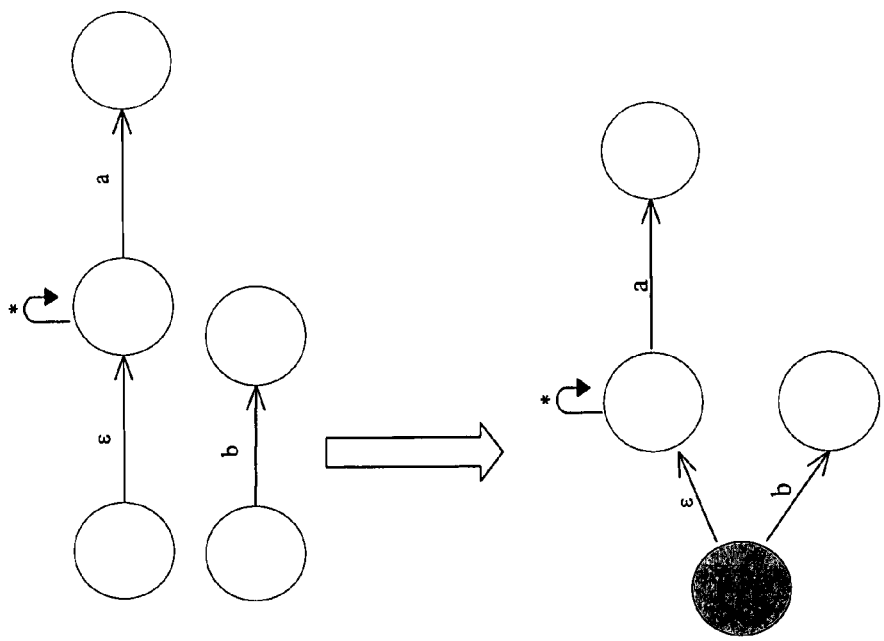

FIG. 5A-5D illustrates four examples of combined NFAs constructed using the above method and the templates of FIG. 3. FIG. 5A illustrates a combined NFA that merges path "/a" with path "/b". FIG. 5B illustrates a combined NFA that merges path "/*" with path "/b". FIG. 5C illustrates a combined NFA that merges path "//a" with path "/b". FIG. 5D illustrates a combined NFA that merges path "//a" with path "//b".

Many different types of data structures may be used to implement and store the combined NFA. Generally, to implement a path expression NFA, a data structure is created for each state, the structure containing (1) an ID of the state; (2) type information (e.g. accepting, '//'-child, ε, etc.); (3) hash table(s) that contain all legal transitions from that state; and (4) for accepting states, a list of IDs of corresponding path expressions.

In one embodiment, the NFA state machine may be created using the following data structure:

```
struct qmnsm
{
    kghsseg  *states_qmnsm;
    ub2      startstate_qmnsm;
    ub4      flags_qmnsm;
}
```

States are represented using IDs, and a segmented array is used to look up the state given its ID. Startstate_qmnsm is the state ID for the start state of the state machine for a particular XML index. In one embodiment, the following function may be used to take a list of XPath expressions (such as the list of paths included with a PATHS parameter) and build a combined NFA state machine for those path expressions:

struct qmnsm *qmnfaPrepareXPaths(1pxexpmode paths, oratext path_str, ub2 num_paths, kghds *heap);

In one embodiment, an in-memory representation of the state machine may use the following data structure to represent a state:

```
struct qmnfaState
{
    ub2     stateid;              /* ID for this state*/
    ub2     *acpt_paths;          /* array of paths accepted here */
    ub2     acpt_paths_len;       /* length of above array */
    qmusht  transitions;          /* hash table of transitions */
    ub2     other_transitions[n]; /* array of transitions for
                                     wildcards, etc. */
    ub2     epsilon_trans;        /* state ID for epsilon transition */
    ub2     ref_cnt;              /* count of paths using this state */
    ub4     flags;                /* flags */
}
```

The following data structure may be used to maintain path information and state reference counts used to implement path enabling and disabling functionality:

```
struct qmnfaPath
{
    ub2      index;         /* index (position) of this xpath */
    oratext  *description;  /* user visible descriptive form of xpath */
    ub2      *states;       /* array of states that belong to this path */
    ub2      num_states;    /* length of above array */
}
```

Figures 6A, 6B:
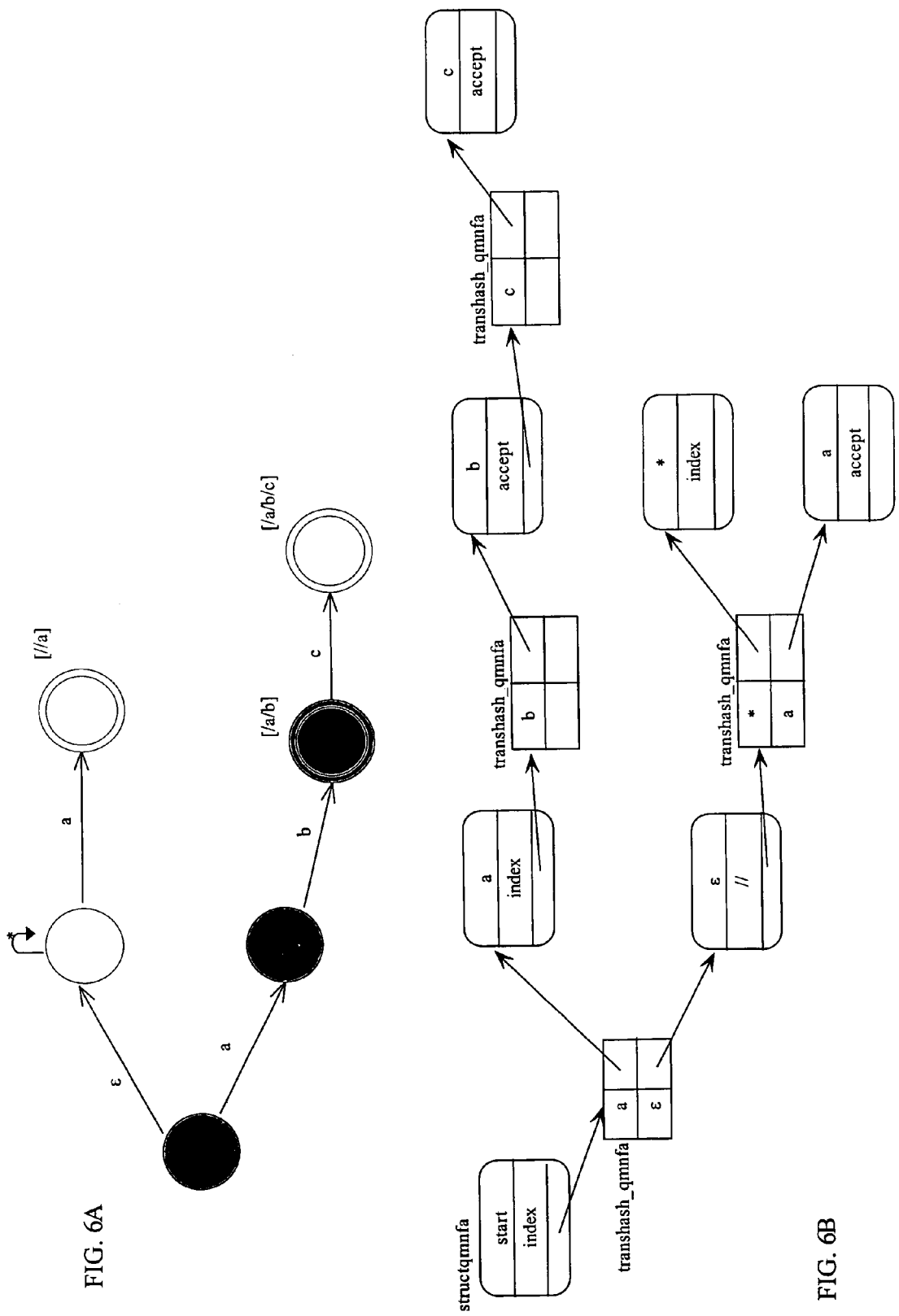
FIG. 6A is a directed graph illustrating a combined NFA path subsetting state machine.
FIG. 6B is a diagram illustrating linked data structures for implementing the combined NFA of FIG. 6A.

FIG. 6A illustrates a directed graph of a combined NFA that represents the set of path expressions /a/b, //a and /a/b/c. FIG. 6B illustrates a linked list of data structures corresponding to the directed graph of FIG. 6A.

PATH Satisfiability

Once created, a combined NFA that represents a set of path expressions used in a path subsetting rule can be used to quickly and efficiently determine whether a given input path is an indexed XML path by determining whether the input path is accepted by the combined NFA. To make this determination, the combined NFA is traversed according to the input path such, that after each step the set of active states corresponds to the states that would occur in all possible documents that are accepted by the input path. If at the end of the traversal there are any accepting states in the set of states, then the input path is accepted, or "satisfied" by the NFA.

According to one embodiment, if a given input path is not specifically indexed, but any ancestor of that path is indexed, then that path will also be included in the index. For example, a user may specify that only paths that match /a/b/c/* should be included in the XML index by including a PATH parameter (PATHS "/a/b/c/*") in the CREATE INDEX command. In this case, nodes associated with the paths /a, /a/b and /a/b/c will also be indexed as long as they are ancestors of any node associated with a path that matches the pattern /a/b/c/*.

For example, consider the combined NFA of the directed graph of FIG. 4. This combined NFA represents the set of path expressions p1-p7 (/a/b, /a/c, /a/b/c, /a//b/c, /a/*/c, /a//c, and /a/*/*/c). If the combined NFA of FIG. 4 is traversed for the path //c, no final state will be found, as the only state that is traversed is state 1. State 1 is not an accepting state. An XML index created using these path subsetting rules will not be able to satisfy a query that includes path expression //c.

However, if the combined NFA of FIG. 4 is traversed for the path /a/b/c/e, even though this is not an explicitly included path in the set of paths, an accepting state will be reached when state 3 is reached. As described below, when any accepting state is reached during the traversal of the NFA for a given path, the path satisfies the combined NFA. As another example, consider traversing the combined NFA of FIG. 4 for path /a/f. Although the NFA does advance from state 1 to state 2, and again to state 9, no accepting state is ever reached. Path /a/f is not satisfied by the combined NFA, and an XML index that includes only this set of paths will not be able to satisfy a query that includes path expression /a/f.

Tables 1, 2 and 3 illustrate pseudo-code that could be used to implement a path satisfiability query by traversing a combined NFA that represents the set of paths specified in the path subsetting rules.

Table 1 contains pseudo-code for the routine "isSatisfied( )" that, given a path, returns a boolean that answers the question "is this path an indexed path?" For the pseudo-code illustrated in Table 1, "p" is the path that is to be analyzed, "NFA" is the combined NFA that was constructed using the PATHS (or PATHS EXLCUDE) parameter of the CREATE INDEX command, "CS" is a set of current states, and "S" is the starting state of combined NFA.

TABLE 1

| 1 | boolean isSatisfied(NFA, p) |
| 2 | { |
| 3 |  CS = S; |
| 4 |  CS = epsilonClosure(NFA, CS); |
| 5 | |

TABLE 1-continued

```
6        for each component c in p
7        {
8            CS = traverseNFA(NFA, CS, c);
9            if (CS contains an accepting state)
10               return TRUE;
11       }
12       return FALSE;
13   }
```

The "isSatisfied( )" routine (Table 1) calls the "traverseNFA( )" routine (Table 2) evaluate each component of the input path "p". "traverseNFA( )" updates the set of current states (CS) according to the traversal of the NFA for that component. As each component of input path is analyzed, a check is made of the set of current states to determine if the set current states includes an accepting state (lines 9-10).

In this embodiment, when at least one accepting state is reached, then no more transversal is needed, as it can be determined that the path can be satisfied by the combined NFA and is therefore an indexed path. As soon as one accepting state is found, "isSatisfied( )" returns without further traversing the combined NFA, thereby enabling a quick and efficient process for determining if a particular path should be indexed in the XML index, or if a path-based query for that path can be satisfied by an XML index.

As shown in Table 1, the input path is evaluated component by component. To evaluate a component of the input path, "traverseNFA( )" (Table 2) calls subroutine "traverse( )" (Table 3) to update the set of current states as determined by traversing the combined NFA for the current component of the path. The combined NFA is traversed from its current set of active states using the transition function determined by the current component being analyzed. The variable "newCS" collects the next set of current states resulting from this traversal.

TABLE 2

```
1    traverseNFA(NFA, CS, c);
2    {
3        newCS = null;
4        for each state s in CS
5            newCS.append(traverse(NFA, s, c));
6
7        return newCS;
8    }
```

TABLE 3

```
1    traverse(NFA, s, c)
2    {
3        stateSet = null;
4        switch (c)
5        {
6            case /a:
7                stateSet = all states got by applying template of /a on s;
8                break;
9            case //a:
10               stateSet = all states got by applying template of //a on s;
11               break;
12           case /*:
13               stateSet = all states got by applying template of /* on s;
14               break;
15           case //*:
16               stateSet = all states got by applying template of //* on s;
17               break;
18       }
19       stateSet = epsilonClosure(stateSet);
20       return stateSet;
21   }
```

The example given in Table 3 uses an "Epsilon Closure" function, which is needed to correctly handle the '//' template, shown in FIG. 3. It is obtained by adding the state ID of the epsilon function corresponding to all states in the set of states.

Many methods of implementing the algorithms of Tables 1-3 are possible. In one embodiment, a stack runtime structure can be used to hold the current list of active states.

In this example embodiment, it is possible to quickly determine whether a path expression is satisfied by a combined NFA that represents a path subsetting rule. In this example embodiment, as soon as one accepting state is reached, the query returns a "true" result indicating that the path expression matches the path subsetting rules. If the combined NFA is traversed for the path expression without ever reaching an accepting state, then a result of "false" can be returned. In this manner, this example embodiment handles matching of ancestor nodes as described above.

In addition, the combined NFA can be used for either a path subsetting rule that uses inclusion (i.e. 'PATHS' parameter), or a path subsetting rule that uses exclusion (i.e. 'PATHS EXCLUDE' parameter). If the path subsetting rule is an inclusion rule, then a positive result means that the path is an indexed path. If the path subsetting rule is an exclusion rule, then a positive result means that the path is not an indexed path. The traversal of the combined NFA is the same regardless of the type of path subsetting rule.

The "isSatisfied( )" routine described above can be used in several contexts. Described herein are three specific use cases: (1) adding a new XML document to the set of indexed documents; (2) altering an XML index by changing the path subsetting rules; and (3) determining whether an XPath query can be satisfied by an XML index. The path subsetting finite state machine described here can be used in additional contexts, and it is not intended that application of the path subsetting finite state machine be limited to these three cases.

Adding a Document to the Set of Indexed Documents

According to one embodiment, when an XML document is added to the repository of indexed XML documents, the new XML document is parsed to identify the paths to the nodes contained therein. As the paths for the nodes within the new XML document are identified, the database server determines which of the nodes contained in the new XML document are to be indexed. The database server then updates the XML index with path, order and value information based on each of those nodes that are included in the index.

FIG. 1, reproduced from the XML Index application, is a flowchart illustrating how new XML documents are processed, according to one embodiment. In FIG. 1, steps 102 and 108 define a loop during which each node within a new XML document is processed. Specifically, at step 102, a previously unprocessed node is selected. During the first iteration, the first node selected for processing will be the root node of the new XML document.

At step 104, the database server determines the path of the currently selected node. At step 106, the database server determines, based on the path, whether the currently selected node is to be indexed. In particular, when path subsetting is used, XML index entries are only added for those nodes that satisfy the user-entered path subsetting rules described above. According to one embodiment, step 106 involves matching the path associated with the current node against the path subsetting rules to determine if the current node should be indexed. If the path associated with the current node should be excluded according to the path subsetting rules, then the subtree (fragment) rooted at the node is omitted from the index.

In one embodiment, Step 106 uses the combined NFA and path satisifiability "isSatisfied( )" routine described above to determine whether the current path is an indexed path. If the path subsetting rules are rules that use inclusion, then a "TRUE" result of the "isSatisfied" function indicates that the current path is to be indexed, and the process continues to step 110; a "FALSE" result will indicate that the current path is to be excluded from the index, and the process continues to step 108. On the other hand, if the path subsetting rules are rules that use exclusion, then a "TRUE" result of the "isSatisfied" function indicates that the current path is not to be indexed, and the process continues to step 108; however, a "FALSE" result will indicate that the current path is to be indexed, and the process continues to step 110.

If it is determined at step 106 that the selected node is not associated with a path that is to be indexed, then control passes to step 108. At step 108, the database server determines whether the new XML document has any more nodes to be processed. If the new XML document does not have any more nodes to be processed, then the process of updating the XML index is complete. Otherwise, if the new XML document does have more nodes to be processed, then control passes back to step 102 and another node is processed.

If at step 106 it is determined that the current node is to be indexed, then the fragment rooted at the node is added to the index. In addition, all its ancestors (element nodes until the root) are also added to the index. Finally, any namespace attributes within the ancestor element nodes are also added to the index.

The operation of processing a node to be indexed is broken out more specifically in FIG. 1, where at step 110 it is determined whether the path associated with the current node as been assigned a PATHID. In the case where the exact path did not exist in previously indexed XML documents, the path may not have been assigned a PATHID. Under such circumstances, control passes to step 112 where a PATHID is assigned to the path. The new PATHID-to-path mapping is then stored within the database.

At step 114, a row containing information about the current node is added to the PATH table. At step 116 the PATHID, ORDERKEY and PARENT_ORDERKEY indexes are updated with entries for the current node. As mentioned above, the PATHID and ORDERKEY entries will point to the new row for the current node, while the PARENT_ORDER-KEY entry will point to the PATH table row for the parent of the current node.

At step 118, it is determined whether the current node is associated with a value. If the current node is not associated with a value, then control passes back to step 108. If the current node is associated with a value, and a value index has been created for the datatype of the value, then at step 120 an index entry is added to the value index associated with that particular datatype. Control then passes back to step 108.

Altering an XML Index

According to one embodiment, a mechanism is provided for altering characteristics of an XML index after the index has been created. Post-creation alteration of the XML index may be performed, for example, in response to an alter index statement.

An important use of the alter index statement for an XML index is to add or delete paths in the path subsetting rule. According to one embodiment, new paths can be added to the index through the following Alter Index command:
ALTER INDEX POIndex
PARAMETERS 'PATHS (/PurchaseOrder/Reference, /Purchaseorder/Actions/Action//*)'

This command indexes all the purchase order references and all the children of Action elements, in case they are not already indexed by the index. Similarly, the following command removes these paths from the index if they are already indexed:
ALTER INDEX POIndex
PARAMETERS 'PATHS EXCLUDE (/PurchaseOrder/Reference, /PurchaseOrder/Actions/Action//*)'

The combined NFA that represents the current path subsetting rules can be used to rebuild the index. For example, during index alteration, a new NFA corresponding to the new set of paths may be constructed. Then all indexed documents are processed by the new NFA in a manner similar to index creation. When the NFA identifies a matching node, the corresponding entries are either added to the index (if not already present) or removed from the index—depending on whether the specified paths are to be included or excluded.

Determining Whether the XML Index can be Used to Satisfy a Query

When a user submits a query involving XPaths, the XPath expressions can be decomposed into SQL queries accessing the XML index table. The generated queries typically perform a set of path, value and order-constrained lookups and merge the results appropriately.

In one embodiment, at query time, if the query XPath can be determined to be a subset of the user specified path subsetting XPaths (and hence guaranteed to be in the index), then the XML index may be used to answer the query. If the subsetting rules relationship cannot be determined at compile-time of the query, then the XML index is not used to satisfy the query.

For example, a user may enter a query that uses an XPath "extract" operator to extract an XML fragment from a stored XML document. Before rewriting the extract operator to query against the XML index path table, the combined NFA that represents the path subsetting rules is traversed to determine if the path expression specified in the extract statement is an indexed XML path.

For example, consider the XML index POIndex1 created by the statement:

```
CREATE INDEX POIndex1 ON purchaseOrder
INDEXTYPE IS XML INDEX
PARAMETERS   'PATHS    (/PurchaseOrder/LineItems//*,
                        /PurchaseOrder/Reference,
                        /PurchaseOrder/Requestor)
              PTH TABLE POIndex_path_table'
```

The XML index POIndex1 may be used to answer the query XPath /PurchaseOrder/LineItems/LineItems/Description. However, the XML index cannot be used to answer the query XPATH //Description, because there could be a <Description> element under a path different from /PurchaseOrder/LineItems. Traversing the combined NFA that is created when the index is created, such as by executing the "isSatisfied( )" routine described above, will efficiently and quickly determine whether the specified query can be answered using the XML index.

In addition, in one embodiment, if an XPath query specifies multiple path expressions, a determination must be made regarding each specified path expression as to whether or not it is an indexed XML path. If any of the path expressions included in an XPath query are not indexed, then it may not be possible to use the XML index, even if other path expressions in the query are indexed (i.e. satisfy the combined NFA).

Hardware Overview

Figure 2:
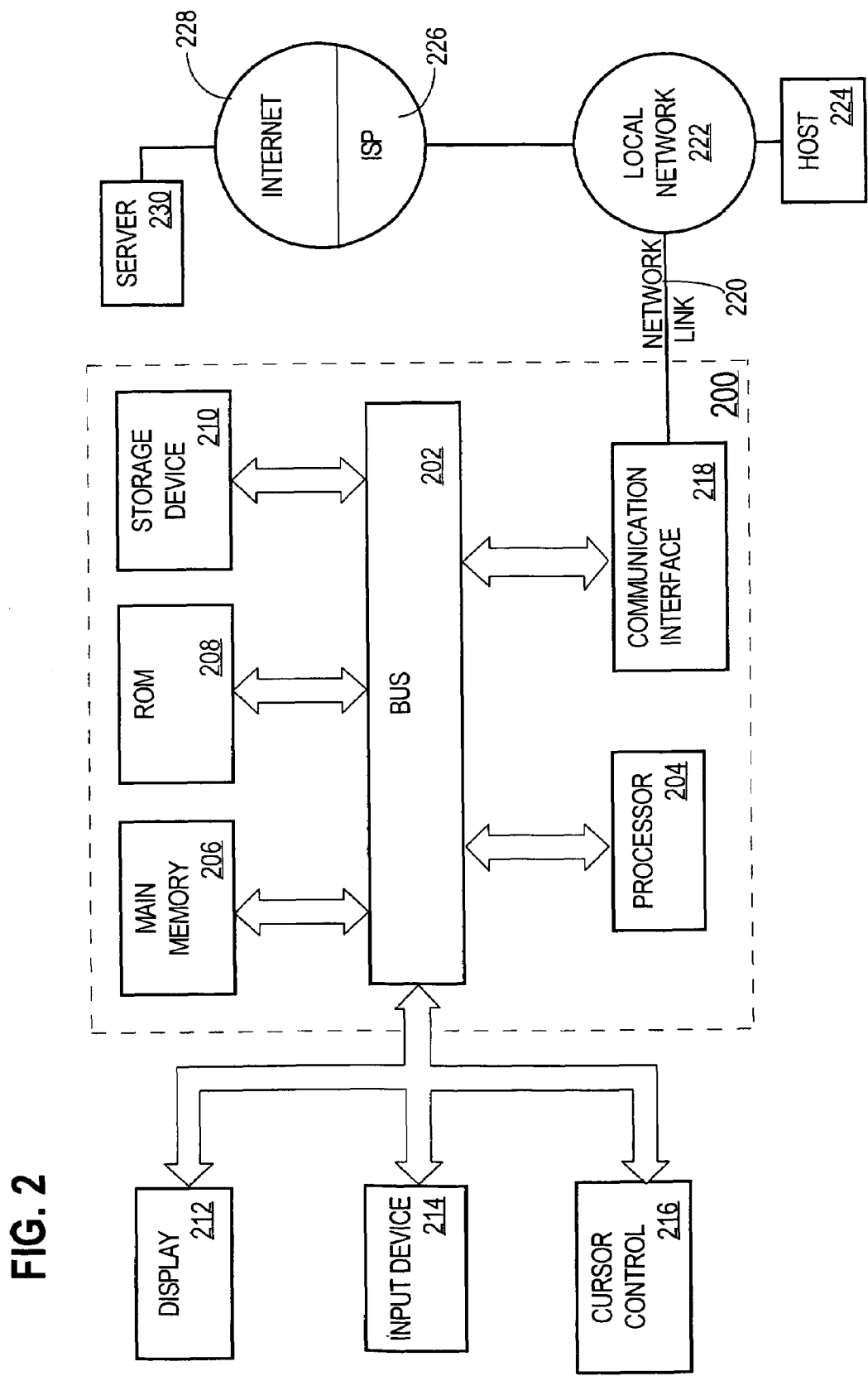
FIG. 2 is a block diagram of a system upon which the techniques described herein may be implemented.

FIG. 2 is a block diagram that illustrates a computer system 200 upon which an embodiment of the invention may be implemented. Computer system 200 includes a bus 202 or other communication mechanism for communicating information, and a processor 204 coupled with bus 202 for processing information. Computer system 200 also includes a main memory 206, such as a random access memory (RAM) or other dynamic storage device, coupled to bus 202 for storing information and instructions to be executed by processor 204. Main memory 206 also may be used for storing temporary variables or other intermediate information during execution of instructions to be executed by processor 204. Computer system 200 further includes a read only memory (ROM) 208 or other static storage device coupled to bus 102 for storing static information and instructions for processor 204. A storage device 210, such as a magnetic disk or optical disk, is provided and coupled to bus 202 for storing information and instructions.

Computer system 200 may be coupled via bus 202 to a display 212, such as a cathode ray tube (CRT), for displaying information to a computer user. An input device 214, including alphanumeric and other keys, is coupled to bus 202 for communicating information and command selections to processor 204. Another type of user input device is cursor control 216, such as a mouse, a trackball, or cursor direction keys for communicating direction information and command selections to processor 204 and for controlling cursor movement on display 212. This input device typically has two degrees of freedom in two axes, a first axis (e.g., x) and a second axis (e.g., y), that allows the device to specify positions in a plane.

The invention is related to the use of computer system 200 for implementing the techniques described herein. According to one embodiment of the invention, those techniques are performed by computer system 200 in response to processor 204 executing one or more sequences of one or more instructions contained in main memory 206. Such instructions may be read into main memory 206 from another machine-readable medium, such as storage device 210. Execution of the sequences of instructions contained in main memory 206 causes processor 204 to perform the process steps described herein. In alternative embodiments, hard-wired circuitry may be used in place of or in combination with software instructions to implement the invention. Thus, embodiments of the invention are not limited to any specific combination of hardware circuitry and software.

The term "machine-readable medium" as used herein refers to any medium that participates in providing data that causes a machine to operation in a specific fashion. In an embodiment implemented using computer system 200, various machine-readable media are involved, for example, in providing instructions to processor 204 for execution. Such a medium may take many forms, including but not limited to, non-volatile media, volatile media, and transmission media. Non-volatile media includes, for example, optical or magnetic disks, such as storage device 210. Volatile media includes dynamic memory, such as main memory 206. Transmission media includes coaxial cables, copper wire and fiber optics, including the wires that comprise bus 202. Transmission media can also take the form of acoustic or light waves, such as those generated during radio-wave and infra-red data communications.

Common forms of machine-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of machine-readable media may be involved in carrying one or more sequences of one or more instructions to processor 204 for execution. For example, the instructions may initially be carried on a magnetic disk of a remote computer. The remote computer can load the instructions into its dynamic memory and send the instructions over a telephone line using a modem. A modem local to computer system 200 can receive the data on the telephone line and use an infra-red transmitter to convert the data to an infra-red signal. An infra-red detector can receive the data carried in the infra-red signal and appropriate circuitry can place the data on bus 202. Bus 202 carries the data to main memory 206, from which processor 204 retrieves and executes the instructions. The instructions received by main memory 206 may optionally be stored on storage device 210 either before or after execution by processor 204.

Computer system 200 also includes a communication interface 218 coupled to bus 202. Communication interface 218 provides a two-way data communication coupling to a network link 220 that is connected to a local network 222. For example, communication interface 218 may be an integrated services digital network (ISDN) card or a modem to provide a data communication connection to a corresponding type of telephone line. As another example, communication interface 218 may be a local area network (LAN) card to provide a data communication connection to a compatible LAN. Wireless links may also be implemented. In any such implementation, communication interface 218 sends and receives electrical, electromagnetic or optical signals that carry digital data streams representing various types of information.

Network link 220 typically provides data communication through one or more networks to other data devices. For example, network link 220 may provide a connection through local network 222 to a host computer 224 or to data equipment operated by an Internet Service Provider (ISP) 226. ISP 126 in turn provides data communication services through the world wide packet data communication network now commonly referred to as the "Internet" 228. Local network 222 and Internet 228 both use electrical, electromagnetic or optical signals that carry digital data streams. The signals through the various networks and the signals on network link 220 and through communication interface 218, which carry the digital data to and from computer system 200, are exemplary forms of carrier waves transporting the information.

Computer system 200 can send messages and receive data, including program code, through the network(s), network link 220 and communication interface 218. In the Internet example, a server 230 might transmit a requested code for an application program through Internet 228, ISP 226, local network 222 and communication interface 218.

The received code may be executed by processor 204 as it is received, and/or stored in storage device 210, or other non-volatile storage for later execution. In this manner, computer system 200 may obtain application code in the form of a carrier wave.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A method for determining whether an input path matches a path subsetting rule used to create a path-based index for a set of XML documents, wherein the path subsetting rule includes a set of path expressions, said set of path expressions represented by a finite state machine, said finite state machine including a plurality of states and a start state, said method comprising the computer-implemented steps of:
    (a) receiving an input path comprised of a sequence of location step components;
    (b) setting a current state of the finite state machine to the start state;
    (c) setting a current location step component to a first location step component of the input path;
    d) setting the current state of the finite state machine to a state determined by traversing the finite state machine for the current location step component;
    (e) if the current state of the finite state machine is an accepting state, determining that the received input path matches the path subsetting rule, and if the current state of the finite state machine is not an accepting state, performing the steps of:
        (i) if there is a next location step component in the input path, then setting the current path expression component to the next location step component and repeating steps (d) and (e); and
        (ii) if there is not a next location step component in the input path, then determining that the input path does not match the path subsetting rule.

2. The method of claim 1 wherein if it is determined that the input path matches the path subsetting rule, the method further including the step of:
    determining that the input path is a path indexed by the path-based index.

3. The method of claim 1 wherein if it is determined that the input path matches the path subsetting rule, the method further including the step of:
    determining that the input path is not a path indexed by the path-based index.

4. The method of claim 1 wherein a location step component is comprised of an axis and a node test.

5. The method of claim 4, wherein said axis is selected from the group consisting of a parent child axis and a descendent-or-self axis.

6. The method of claim 4, wherein said node test is selected from the group consisting of an element name and a wildcard symbol.

7. A method of determining whether an input path matches a path subsetting rule that is used to create a path-based index for a set of XML documents, said method comprising the computer-implemented steps of:
    receiving, from a user, a command that includes the path subsetting rule, wherein the path subsetting rule specifies a set of paths that identify a set of nodes, in the set of XML documents, that are to be indexed:
    creating the path-based index for the set of XML documents based on the path subsetting rule, wherein creating the path-based index comprises creating a finite state machine that represents the path subsetting rule;
    traversing the finite state machine using the input path; and
    if an accepting state of the finite state machine is reached while traversing the finite state machine, then determining that the input path matches the path subsetting rule.

8. The method of claim 7 wherein the path subsetting rule is an inclusion rule, wherein if an accepting state of the finite state machine is reached, the method further including the step of:
    determining that the input path is a path indexed by the path-based index.

9. The method of claim 8 further comprising: based on determining that the input path is indexed, using the path-based index to access information within the set of XML documents that is associated with the input path.

10. The method of claim 7 wherein the path subsetting rule is an exclusion rule, wherein if an accepting state of the finite state machine is reached, the method further including the step of:
    determining that the input path is not a path indexed by the path-based index.

11. The method of claim 7 wherein the finite state machine is a combined non-deterministic automaton that represents a set of path expressions specified in the path subsetting rule.

12. The method of claim 11 wherein the finite state machine includes multiple accepting states.

13. The method of claim 12 wherein if an accepting state that represents an ancestor of the input path is reached, then determining that the input path matches the path subsetting rule.

14. The method of claim 7, wherein said input path is a path expression from a path-based query, wherein if the input path matches the path subsetting rule, then determining that the path-based query can be satisfied using the path-based index.

15. The method of claim 7, wherein said received input path is a path in an XML document being added to the set of XML documents, wherein if the received input path matches the path subsetting rules, then determining that the path in the XML document should be added to the path-based index.

16. The method of claim 15, additionally comprising the step of determining that all ancestors of the path in the XML document should be added to the path-based index.

17. The method of claim 7 wherein the path-based index includes path, value and order indexes.

18. The method of claim 7, wherein the path subsetting rule is specified through a parameter when the path-based index is created.

19. A machine-readable volatile or non-volatile medium storing one or more sequences of instructions which, when executed by one or more processors, causes the one or more processors to perform the method recited in claim 1.

20. A machine-readable volatile or non-volatile medium storing one or more sequences of instructions which, when executed by one or more processors, causes the one or more processors to perform the method recited in claim 2.

21. A machine-readable volatile or non-volatile medium storing one or more sequences of instructions which, when executed by one or more processors, causes the one or more processors to perform the method recited in claim 3.

22. A machine-readable volatile or non-volatile medium storing one or more sequences of instructions which, when executed by one or more processors, causes the one or more processors to perform the method recited in claim 4.

23. A machine-readable volatile or non-volatile medium storing one or more sequences of instructions which, when executed by one or more processors, causes the one or more processors to perform the method recited in claim 5.

24. A machine-readable volatile or non-volatile medium storing one or more sequences of instructions which, when executed by one or more processors, causes the one or more processors to perform the method recited in claim 6.

25. A machine-readable volatile or non-volatile medium storing one or more sequences of instructions which, when executed by one or more processors, causes the one or more processors to perform the method recited in claim 7.

26. A machine-readable volatile or non-volatile medium storing one or more sequences of instructions which, when executed by one or more processors, causes the one or more processors to perform the method recited in claim 8.

27. A machine-readable volatile or non-volatile medium storing one or more sequences of instructions which, when executed by one or more processors, causes the one or more processors to perform the method recited in claim 9.

28. A machine-readable volatile or non-volatile medium storing one or more sequences of instructions which, when executed by one or more processors, causes the one or more processors to perform the method recited in claim 10.

29. A machine-readable volatile or non-volatile medium storing one or more sequences of instructions which, when executed by one or more processors, causes the one or more processors to perform the method recited in claim 11.

30. A machine-readable volatile or non-volatile medium storing one or more sequences of instructions which, when executed by one or more processors, causes the one or more processors to perform the method recited in claim 12.

31. A machine-readable volatile or non-volatile medium storing one or more sequences of instructions which, when executed by one or more processors, causes the one or more processors to perform the method recited in claim 13.

32. A machine-readable volatile or non-volatile medium storing one or more sequences of instructions which, when executed by one or more processors, causes the one or more processors to perform the method recited in claim 14.

33. A machine-readable volatile or non-volatile medium storing one or more sequences of instructions which, when executed by one or more processors, causes the one or more processors to perform the method recited in claim 15.

34. A machine-readable volatile or non-volatile medium storing one or more sequences of instructions which, when executed by one or more processors, causes the one or more processors to perform the method recited in claim 16.

35. A machine-readable volatile or non-volatile medium storing one or more sequences of instructions which, when executed by one or more processors, causes the one or more processors to perform the method recited in claim 17.

36. A machine-readable volatile or non-volatile medium storing one or more sequences of instructions which, when executed by one or more processors, causes the one or more processors to perform the method recited in claim 18.

37. The method of claim 7, wherein creating the finite state machine comprises:
determining a sequence of location steps from the path subsetting rule;
matching one or more of the sequence of location steps to one or more templates that represent one or more pre-defined state machines; and
constructing the finite state machine by using the one or more templates.

38. A machine-readable volatile or non-volatile medium storing one or more sequences of instructions which, when executed by one or more processors, causes the one or more processors to perform the method recited in claim 37.

* * * * *

UNITED STATES PATENT AND TRADEMARK OFFICE
CERTIFICATE OF CORRECTION

PATENT NO. : 7,493,305 B2  Page 1 of 2
APPLICATION NO. : 11/059665
DATED : February 17, 2009
INVENTOR(S) : Thusoo et al.

It is certified that error appears in the above-identified patent and that said Letters Patent is hereby corrected as shown below:

On the face page, in field (74), under "Attorney, Agent or Firm", in column 2, line 1, delete "Hichman" and insert -- Hickman --, therefor.

In column 4, line 30, delete "With" and insert -- with --, therefor.

In column 7, line 23, before "this" insert -- In --.

In column 12, line 5, delete "LineItems" and insert -- LineItems --, therefor.

In column 12, line 7, delete "LineItems" and insert -- LineItems --, therefor.

In column 12, line 8, delete "LineItems" and insert -- LineItems --, therefor.

In column 14, line 42, delete "can-be" and insert -- can be --, therefor.

In column 15, line 35, delete "1pxexpmode" and insert -- 1pxexprnode --, therefor.

In column 16, line 14, delete "such," and insert -- such --, therefor.

In column 16, line 59, after "of" insert -- the --.

In column 17, line 13, before "evaluate" insert -- to --.

In column 17, line 16, before "input" insert -- the --.

In column 17, line 18, before "current" insert -- of --.

In column 17, line 20, delete "transversal" and insert -- traversal --, therefor.

In column 20, line 61, delete "LineItems/LineItems" and insert -- LineItems/LineItems --, therefor.

Signed and Sealed this

Eighteenth Day of May, 2010

David J. Kappos
*Director of the United States Patent and Trademark Office*

In column 20, line 65, delete "LineItems" and insert -- LineItems --, therefor.

In column 23, line 33, in claim 1, delete "d)" and insert -- (d) --, therefor.

In column 24, line 6, in claim 7, delete "indexed:" and insert -- indexed; --, therefor.

In column 24, line 21, in claim 9, delete "based on" and insert the same on line 22 before "determining".